(12) United States Patent
Zhang et al.

(10) Patent No.: US 7,492,585 B2
(45) Date of Patent: Feb. 17, 2009

(54) MOUNTING APPARATUS FOR DATA STORAGE DEVICE

(75) Inventors: Wen-Min Zhang, Shenzhen (CN); Qin Guo, Shenzhen (CN); Pin-Shian Wu, Tu-cheng (TW); Hsuan-Tsung Chen, Tu-cheng (TW); Chun-Chi Liang, Tu-cheng (TW)

(73) Assignees: Hong Fu Jin Precision Industry (ShenZhen) Co., Ltd., ShenZhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 117 days.

(21) Appl. No.: 11/592,847

(22) Filed: Nov. 3, 2006

(65) Prior Publication Data

US 2007/0268662 A1 Nov. 22, 2007

(30) Foreign Application Priority Data

May 19, 2006 (CN) .................. 2006 2 0014003

(51) Int. Cl.
*G06F 1/16* (2006.01)
*H05K 5/00* (2006.01)
*H05K 7/00* (2006.01)

(52) U.S. Cl. .................. 361/685; 312/334.7

(58) Field of Classification Search ............. 361/685, 361/684; 312/334.7, 333; 248/222.11
See application file for complete search history.

(56) References Cited

U.S. PATENT DOCUMENTS

| 5,683,159 | A | 11/1997 | Johnson | |
|---|---|---|---|---|
| 7,036,783 | B2 * | 5/2006 | Chen et al. | 248/298.1 |
| 7,061,756 | B2 * | 6/2006 | Wu | 361/685 |
| 7,180,734 | B2 * | 2/2007 | Jing | 361/685 |
| 7,327,565 | B2 * | 2/2008 | Chen et al. | 361/685 |
| 2005/0195564 | A1 * | 9/2005 | Peng et al. | 361/685 |
| 2006/0034048 | A1 * | 2/2006 | Xu | 361/685 |
| 2006/0187632 | A1 * | 8/2006 | Chen et al. | 361/685 |

* cited by examiner

*Primary Examiner*—Hae Moon Hyeon
(74) *Attorney, Agent, or Firm*—Wei Te Chung

(57) ABSTRACT

A mounting apparatus for mounting a data storage device, which has a protrusion thereon, includes a bracket, a fixing member movably mounted to the bracket, a resilient member connected between the bracket and the fixing member, and a latching member mounted to the fixing member. The bracket for holding the data storage device includes a sidewall. The sidewall defines a slide slot configured for the protrusion of the data storage device sliding therealong. The latching member includes a retaining space for receiving the protrusion of the data storage device. The latching member is selectively locatable in at least two positions of the fixing member.

20 Claims, 6 Drawing Sheets

MOUNTING APPARATUS FOR DATA STORAGE DEVICE

CROSS-REFERENCE TO RELATED APPLICATION

Relevant subject matter is disclosed in the copending U.S. patent application filed on the same date with application Ser. No. 11/592,769 and having a same title with the present application, which is assigned to the same assignee as this patent application.

BACKGROUND OF THE INVENTION

1. Field of the Invention

The present invention relates to mounting apparatuses, and particularly to a mounting apparatus which readily allows securely installing or readily removing a data storage device to or from a computer enclosure.

2. Description of Related Art

Generally speaking, when a computer is assembled, a drive bracket is mounted in a computer enclosure, and then data storage devices are fixed to the drive bracket. The data storage devices include various combinations of hard disk drives (HDDs), floppy disk drives (FDDs), and compact disk-read only memory (CD-ROM) drives.

A conventional data storage device is generally attached to a drive bracket by bolts or slide rails. However, fixing a data storage device to a drive bracket with bolts is unduly laborious and time-consuming. A mounting apparatus for a data storage device using slide rails is disclosed in U.S. Pat. No. 5,683,159. The date storage device defines a plurality of locking holes in opposite sidewalls thereof. The mounting apparatus includes a computer enclosure, and a pair of slide rails each having resilient tabs thereof. According to the locking holes of the data storage device, a pin extends from each resilient tab. The slide rails are attached to respective sides of the data storage device. The assembly of the data storage device and the slide rails is slidably inserted into the computer enclosure. The pins of the slide rails are engaged in the corresponding locking holes. However, when positions of the data storage devices are needed to be changed within the computer enclosure, both the data storage devices and the slide rails must be extracted and the mounting process repeated. Thus, adjusting positions of the data storage device fixed within the drive bracket with bolts or slide rails is difficult and inconvenient.

What is desired, therefore, is to provide a mounting apparatus which readily allows securely installing a data storage device in different positions.

SUMMARY OF THE INVENTION

An exemplary mounting apparatus for mounting a data storage device, which has a protrusion thereon, includes a bracket, a fixing member movably mounted to the bracket, a resilient member connected between the bracket and the fixing member, and a latching member mounted to the fixing member. The bracket for holding the data storage device includes a sidewall. The sidewall defines a slide rail configured for the protrusion of the data storage device sliding therealong. The latching member includes a retaining space for receiving the protrusion of the data storage device. The latching member is selectively locatable in at least two positions of the fixing member.

Other advantages and novel features will become more apparent from the following detailed description of preferred embodiments when taken in conjunction with the accompanying drawings, in which:

DETAILED DESCRIPTION OF THE INVENTION

Figure 1:
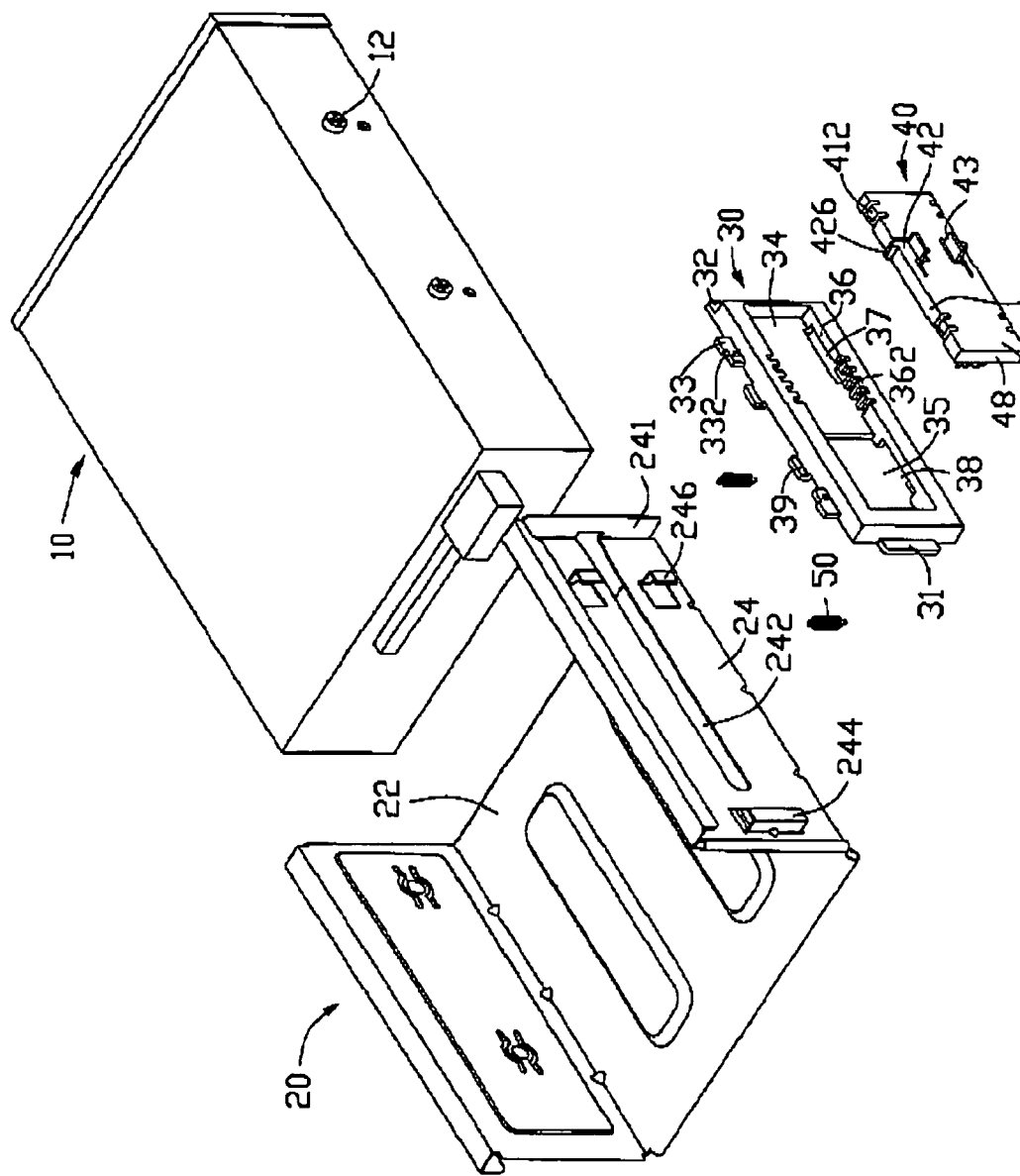
FIG. 1 is an exploded, isometric view of a mounting apparatus in accordance with a preferred embodiment of the present invention, together with a data storage device; the mounting apparatus includes a bracket, a fixing member, and a latching member.
Figure 2:
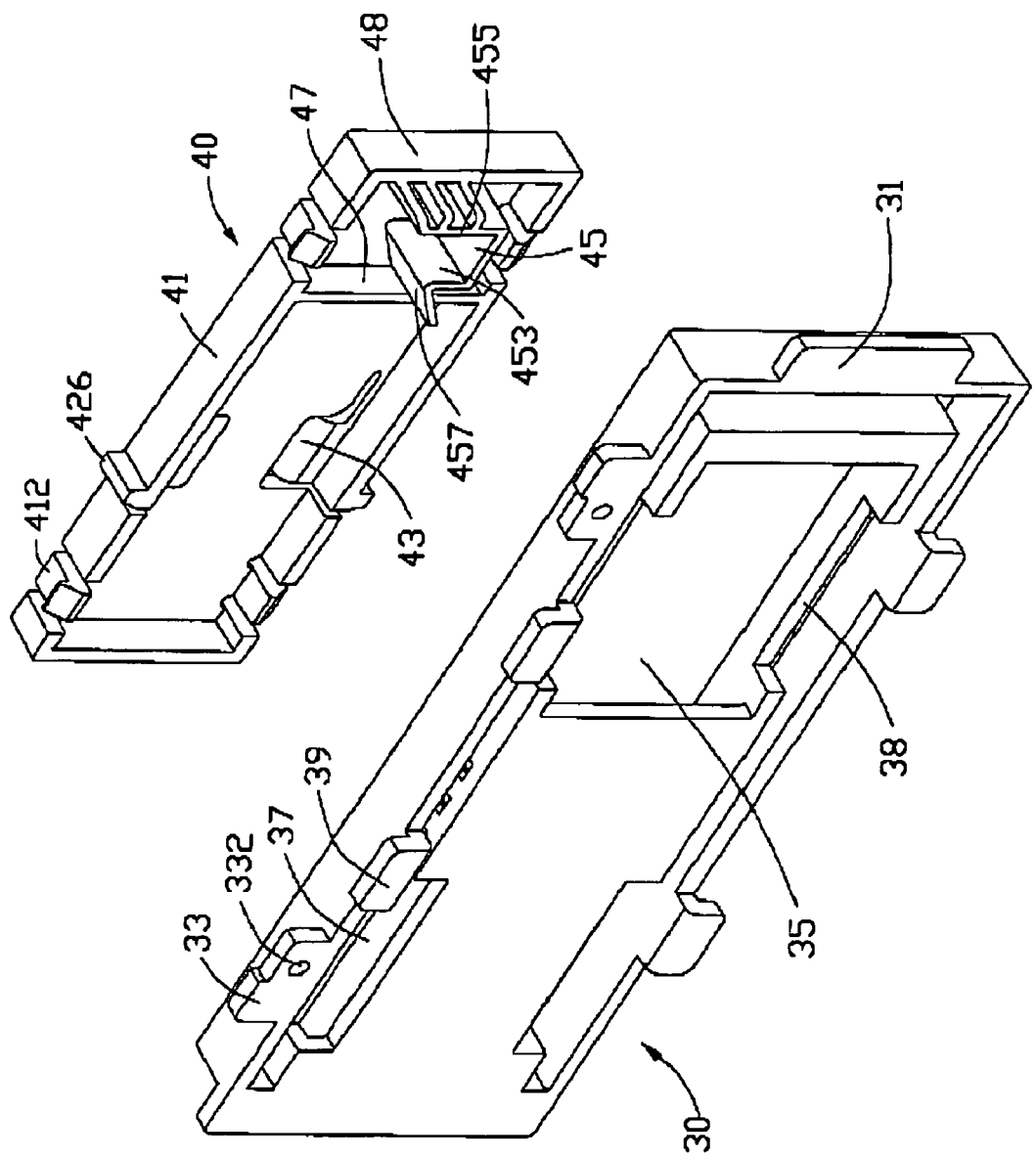
FIG. 2 is an enlarged view of the fixing member and the latching member of FIG. 1, but viewed from another aspect.

Referring to FIGS. 1 and 2, a mounting apparatus in accordance with a preferred embodiment of the present invention is provided for mounting a data storage device 10 that has two protrusions 12 protruding from a side wall thereof. The mounting apparatus includes a bracket 20 for holding the data storage device 10, a fixing member 30 moveably mounted to the bracket 20, a latching member 40 mounted to the fixing member 30, and a pair of resilient members 50. In the preferred embodiment, the data storage device 10 is a CD-ROM drive, the protrusions 12 are screws, and the resilient members 50 are springs.

The bracket 20 includes a bottom wall 22, and a sidewall 24 extending up from a side of the bottom wall 22. A flange 241 perpendicularly extends out from an end of the sidewall 24. According to the protrusions 12 of the data storage device 10, a slide slot serving as a guideway 242 is defined in the sidewall 24, and extends from the flange 241 to the other end of the sidewall 24. The slide slot 242 is parallel to the bottom wall 22. An L-shaped first limiting tab 244 extends from the sidewall 24 adjacent a back end of the slide slot 242. Two L-shaped limiting tabs 246 extend out from the sidewall 24 and are respectively located at upper and lower sides of the slide slot 242 adjacent the flange 241. Two hooks (not shown) with a certain space therebetween are formed at an upper portion of the sidewall 24.

A pair of projections 39 extend from each of top and bottom sides of the fixing member 30. Two limiting protrusions 31, 32 extend respectively from opposite ends of the fixing member 30. Two fixing portions 33 each defining a through hole 332 respectively extend out from the top side of the fixing member 30 at opposite sides of the corresponding projections 39. A depressed portion is defined in the fixing member 30. The depressed portion includes two side boards 36 at top and bottom sides thereof, and a restricting board 34 connected between the side boards 36. An opening 35 is defined in the depressed portion at a side of the restricting board 34 and between the side boards 36. A plurality of locking slots 362 is defined in each side board 36. Two slots 37 are defined in top and bottom sides of the restricting board 34. Two sliding slots 38 are defined respectively in each side board 36 adjacent to and communicating with, the opening 35.

The latching member 40 includes a body 49, two side walls 41 extending from top and bottom sides of the body 49, and two end walls 48 extending from opposite ends of the body 49. Two resilient latching portions 412 corresponding to a corresponding sliding slot 38 and a corresponding slot 37 of the fixing member 30 respectively extend from each side wall 41. A resilient finger 42 extends from the latching member 40 at each side wall 41, and a corresponding portion of the body 49. A protruding portion 426 at a corresponding side wall 41 of the latching member 40 extends from a free end of each resilient finger 42. An operating portion 43 extends out from each resilient finger 42 at the body 49. A blocking tab 47 facing the fixing member 30 is arranged at the body 49 and adjacent the opening 35. A general U-shaped retaining portion is arranged between the blocking tab 47 and a corresponding end wall 48. The retaining portion includes a first blocking part 453, and a second blocking part 455, parallel to the end wall 48. A retaining space 45 is defined between the first blocking part 453 and the second blocking part 455. A slanted guiding portion 457 extends from a distal end of the first blocking part 453 toward the blocking tab 47. A free end of the slanted guiding portion 457 is against the blocking tab 47. The second blocking part 455 is linked to the end wall 48 by a plurality of spaced connecting ribs.

Figure 3:
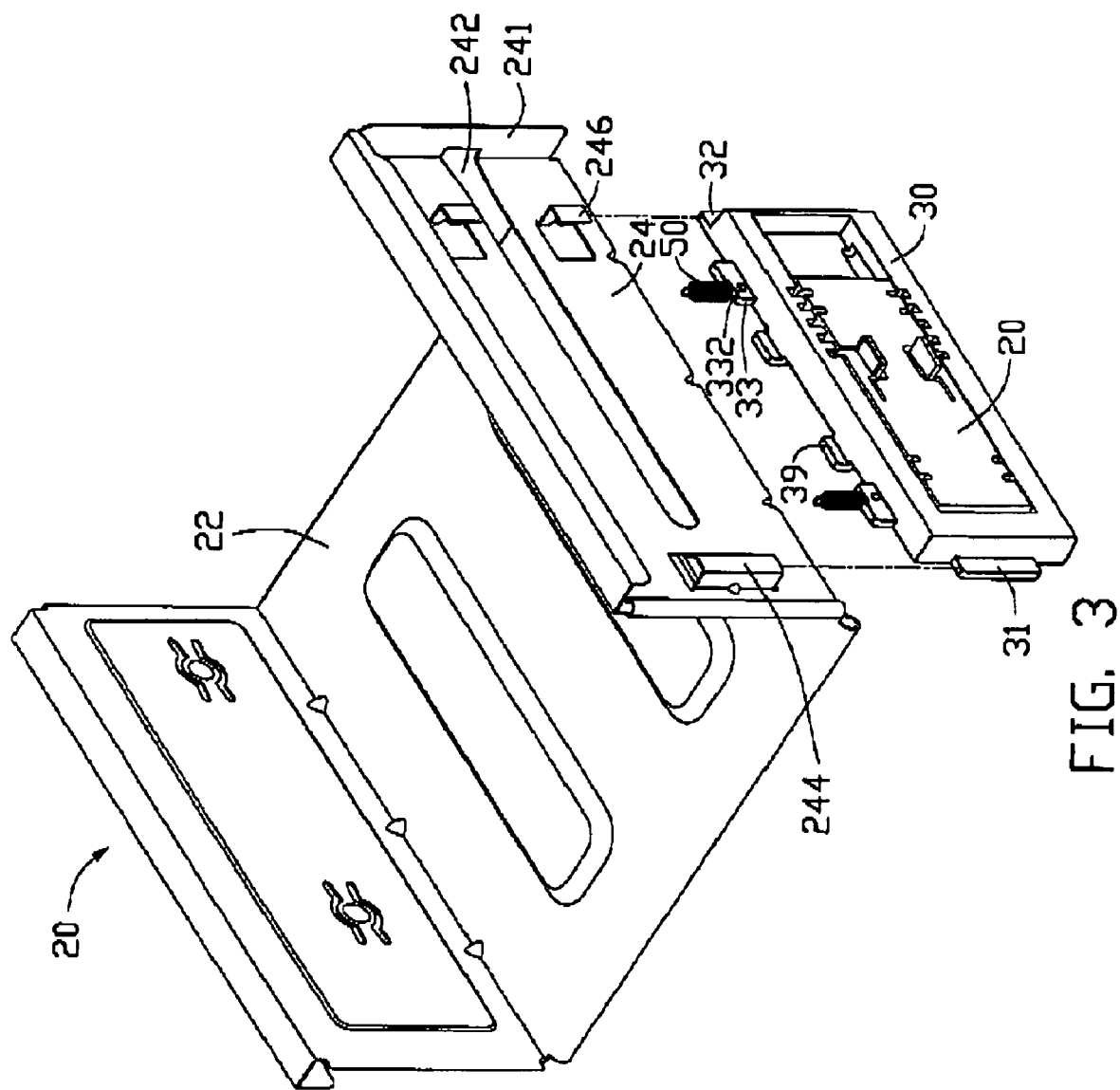
FIG. 3 is a partially assembled view of FIG. 1.
Figure 4:
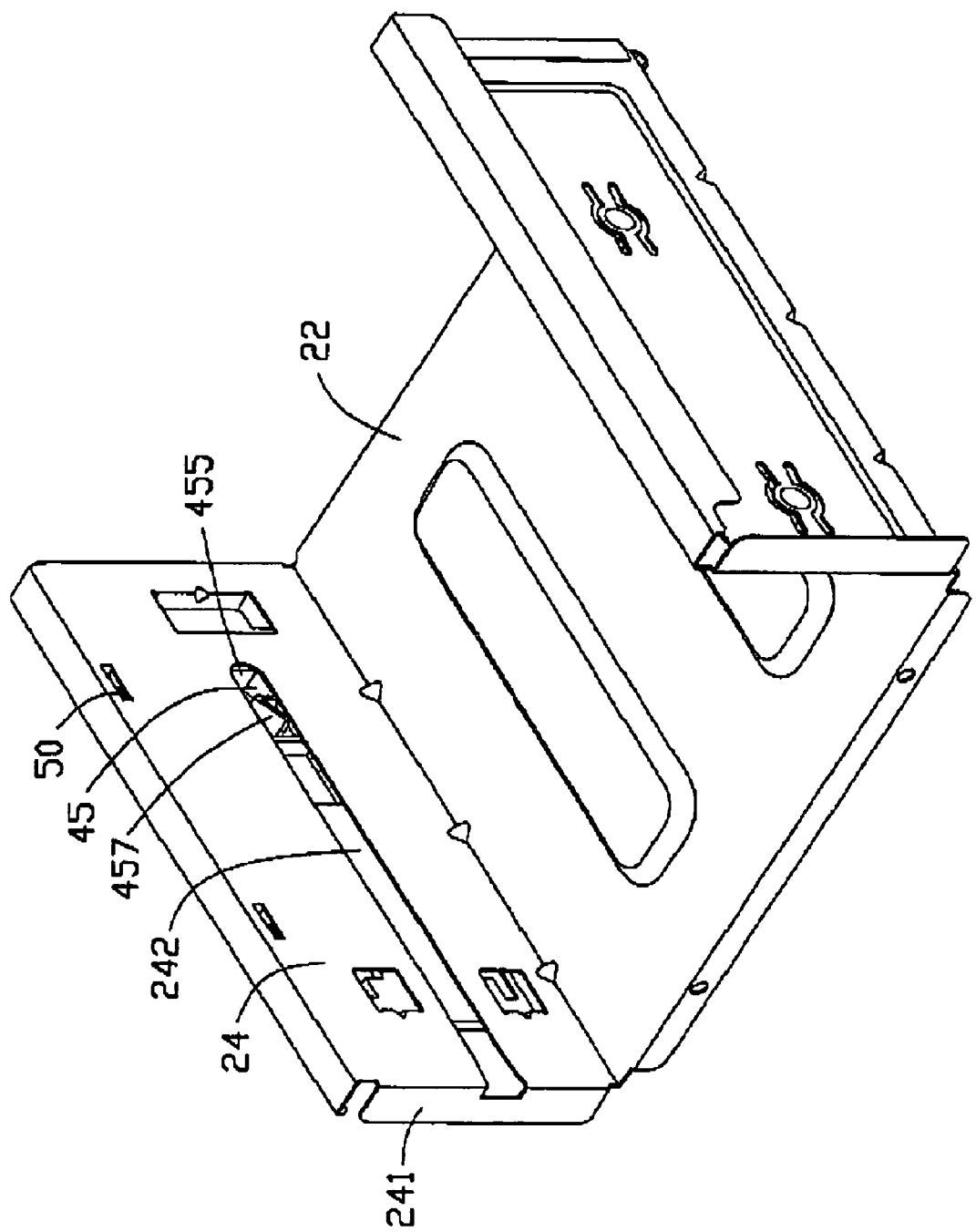
FIG. 4 is an assembled view of FIG 1, but viewed from another aspect, and not showing the data storage device.
Figure 5:
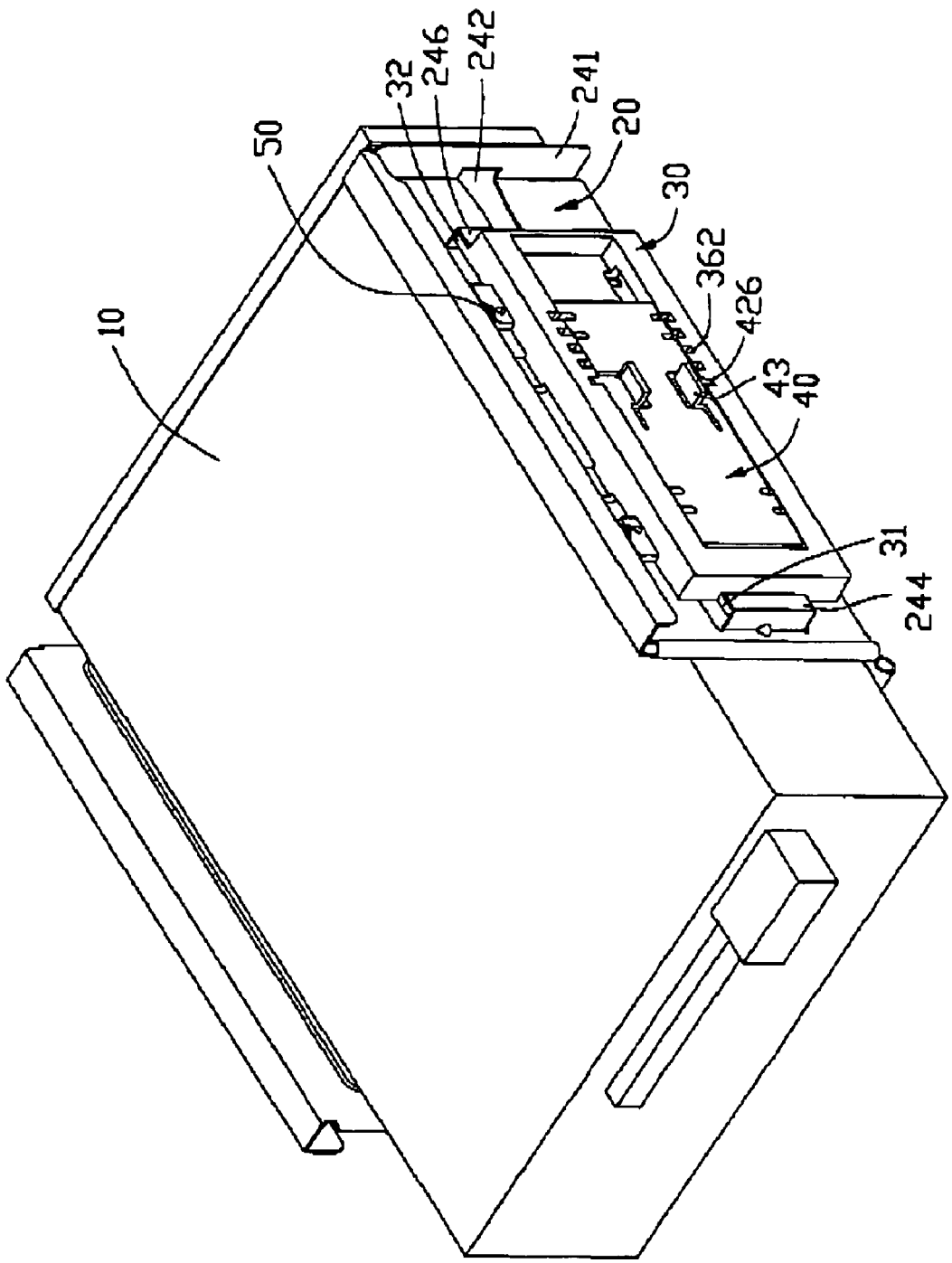
FIG. 5 is an assembled view of FIG 1, showing the data storage device in a first mounting position.

Referring also to FIGS. 3 to 5, in assembling the fixing member 30 and the latching member 40 to the bracket 20, the resilient latching portions 412 of the latching member 40 are respectively inserted in the corresponding slots 37 and the corresponding sliding slots 38 of the fixing member 30. The retaining portion of the latching member 40 is received in the opening 35 of the fixing member 30. The protruding portions 426 of the latching member 40 are engaged in the corresponding looking slots 362 of the fixing member 30. The latching member 40 can be positioned at different positions via the protruding portions 426 engaging in different locking slots 362 of the fixing member 30. In mounting the assembly of the fixing member 30 and the latching member 40 to the sidewall 24 of the bracket 20, one end of each resilient member 50 is engaged in the through hole 332 of the corresponding fixing portion 33. The limiting protrusions 31, 32 of the fixing member 30 slide along the corresponding limiting tabs 244, 246 from down to up. The projections 39 of the fixing member 30 are depressed by the sidewall 24 of the bracket 20. The other end of each resilient member 50 is engaged with a corresponding hook of the bracket 20.

In assembling the data storage device 10 in the bracket 20, the protrusions 12 of the data storage device 10 are slid into the slide slot 242 of the sidewall 24 from the flange 241 at one side of the bracket 20. The data storage device 10 is then moved further, and a corresponding protrusion 12 of the data storage device 10 slides on the slanting guiding portion 457 of the latching member 40 to drive the latching member 40 to move down. The resilient members 50 are distorted. The data storage device 10 is moved further still, so that the protrusion 12 moves beyond the slanting guiding portion 457. The resilient members 50 are elastically thus restoring the latching member 40. The protrusion 12 is located in the retaining space 45 of the latching member 40. Thus, the data storage device 10 is mounted in one position of the bracket 20 as shown in FIG. 5.

Figure 6:
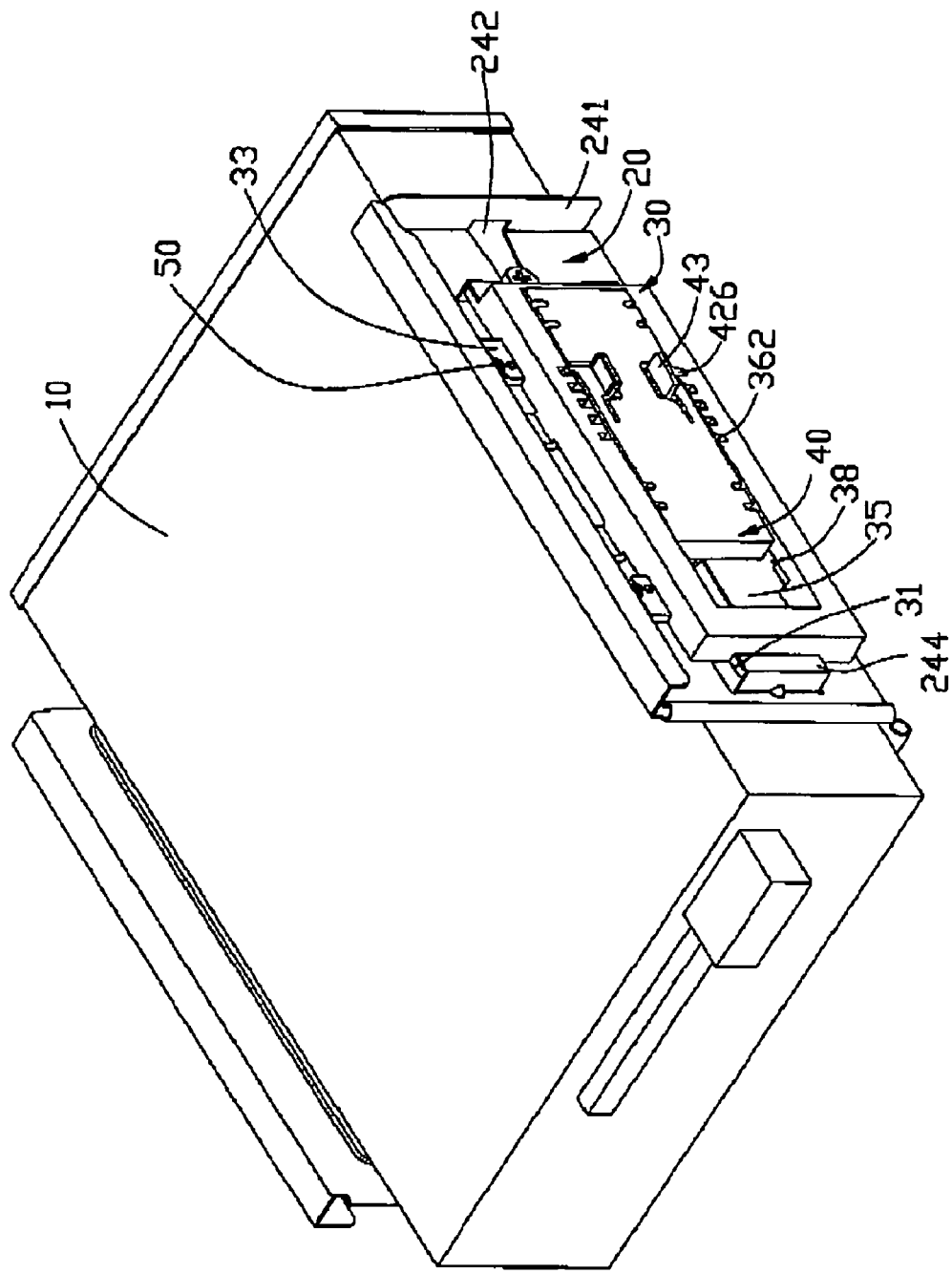
FIG. 6 is similar to FIG 5, but showing the data storage device in a second mounting position.

When adjusting mounting positions of the data storage device 10, the operating portions 43 of the latching member 40 are squeezed to drive the resilient fingers 42 of the latching member 40 to distort. The protruding portions 426 are disengaged from the corresponding locking slots 362 of the fixing member 30. The latching member 40 and the data storage device 10 attached thereto are slid within the fixing member 30 until the protruding portions 426 of the lathing member 40 are engaged in desired locking slots 362. Thus, the data storage device 10 is mounted in another desired position of the bracket 20, as shown in FIG. 6.

In disassembling the data storage device 10, the fixing member 30 is slid down along the limiting tabs 244, 246 of the sidewall 24 until the slanting guiding portion 457 is below the slide slot 242. The resilient members 50 are stretched and distorted. Thus, the data storage device 10 is readily removed from the bracket 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A mounting apparatus for mounting a data storage device which has a protrusion protruding from a side wall thereof, the mounting apparatus comprising:

a bracket configured for holding the data storage device comprising a sidewall, the sidewall defining a guideway along a front to back direction configured for the protrusion of the data storage device sliding therealong;

a fixing member mounted to the sidewall of bracket and movable in a direction perpendicular to the front to back direction;

a resilient member connected between the sidewall of the bracket and the fixing member; and a latching member mounted to the fixing member comprising a retaining space for receiving the protrusion of the data storage device, the latching member selectively located in at least two different positions of the fixing member to allow the retaining space having at least two locking positions for the data storage device, the two positions are arranged along the front to back direction.

2. The mounting apparatus as claimed in claim 1, wherein the fixing member comprises two side boards, a plurality of locking slots that are arranged along the front to back direction are defined in each of the side boards; the latching member comprises a body, and two side walls extending from top and bottom sides of the body, a protruding portion extends from each of the side walls of the latching member for being selectively engaged in the corresponding locking slots of the fixing member.

3. The mounting apparatus as claimed in claim 2, wherein two limiting protrusions extend respectively from opposite ends of the fixing member, and at least two limiting tabs extend out from the sidewall of the bracket for the corresponding limiting protrusions of the fixing member sliding therealong.

4. The mounting apparatus as claimed in claim 2, wherein a fixing portion defining a through hole extends out from a top of the fixing member; one end of the resilient member is engaged with an upper portion of the sidewall of the bracket, and the other end of the resilient member is engaged in the through hole of the fixing portion.

5. The mounting apparatus as claimed in claim 2, wherein a depressed portion is defined in the fixing member, the side boards are located at top and bottom sides of the depressed portion, a restricting board is connected between the side boards, an opening is defined in the depressed portion at a side of the restricting board and between the side boards.

6. The mounting apparatus as claimed in claim 5, wherein two slots are defined respectively in top and bottom sides of the restricting board, two sliding slots are defined respectively in each of the side boards adjacent to and communicating with the opening, two resilient latching portions corresponding to a corresponding sliding slot and a corresponding slot of the fixing member respectively extend from each of the side walls of the latching member.

7. The mounting apparatus as claimed in claim 5, wherein a blocking tab extends from a side of the latching member, the latching member comprises a retaining portion, the retaining portion comprises a first blocking part, and a second blocking part, the retaining space is defined between the first blocking part and the second blocking part; a slanted guiding portion extends from a distal end of the first blocking part toward the blocking tab.

8. The mounting apparatus as claimed in claim 2, wherein a resilient finger extends from the latching member at each of the side walls and a corresponding portion of the body, each of the protruding portions extend from a free end of each of the resilient fingers at a corresponding side wall of the latching member.

9. The mounting apparatus as claimed in claim 8, wherein an operating portion extends out from each of the resilient fingers at the body.

10. An assembly comprising:
   a data storage device comprising a protrusion protruding from a side wall thereof;
   a bracket configured for holding the data storage device comprising a sidewall, the sidewall defining a guideway along a front to back direction configured for the protrusion of the data storage device sliding therealong;
   a fixing member mounted to the bracket and movable in a direction perpendicular to the front to back direction;
   a resilient member connected between the sidewall of the bracket and the fixing member; and
   a latching member mounted to the fixing member comprising a retaining space for receiving the protrusion of the data storage device, the latching member selectively located in at least two positions of the fixing member, the two positions are arranged alone the front to back direction.

11. The assembly as claimed in claim 10, wherein the fixing member comprises two side boards, a plurality of locking slots are defined in each of the side boards alone the front to back direction; the latching member comprises a body, and two side walls extending from top and bottom sides of the body, a protruding portion extends from each of the side walls of the latching member for being selectively engaged in the corresponding locking slots of the fixing member.

12. The assembly as claimed in claim 11, wherein a fixing portion defining a through hole extends out from a top of the fixing member; one end of the resilient member is engaged with an upper portion of the sidewall of the bracket and the other end is engaged in the through hole of the fixing portion.

13. The assembly as claimed in claim 11, wherein a depressed portion is defined in the fixing member, the side boards are located at top and bottom sides of the depressed portion, and a restricting board is connected between the side boards, an opening is defined in the depressed portion at a side of the restricting board and between the side boards.

14. The assembly as claimed in claim 13, wherein two slots are defined respectively in top and bottom sides of the restricting board, two sliding slots are defined respectively in each of the side boards adjacent to and communicating with the opening, two resilient latching portions corresponding to a corresponding sliding slot and a corresponding slot of the fixing member respectively extend from each of the side walls of the latching member.

15. The assembly as claimed in claim 13, wherein a blocking tab extends from a side of the latching member, the latching member comprises a retaining portion, the retaining portion comprises a first blocking part, and a second blocking part, the retaining space is defined between the first blocking part and the second blocking part; a slanted guiding portion extends from a distal end of the first blocking toward the blocking tab.

16. The assembly as claimed in claim 11, wherein a resilient finger extends from the latching member at each of the side walls and a corresponding portion of the body, each of the protruding portions extend from a free end of each of the resilient fingers at a corresponding side wall of the latching member.

17. The assembly as claimed in claim 16, wherein an operating portion extends out from each of the resilient fingers at the body.

18. A mounting apparatus for mounting a data storage device which has a protrusion protruding from a side wall thereof, the mounting apparatus comprising:
   a bracket configured for holding the data storage device therein, the bracket comprising a sidewall, the sidewall defining a guideway configured for the protrusion of the data storage sliding therealong in a left-and-right direction;
   a fixing member mounted to the sidewall of the bracket and being slidable with respect to the sidewall in an up-and-down direction;
   a resilient member connected between the bracket and the fixing member; and
   a latching member mounted to the fixing member comprising a retaining structure for retaining the protrusion of the data storage device, the latching member together with data storage device being movable with respect to the fixing member between at least two positions in the left-and-right direction and selectively located in any one of the at least two positions whereby the retaining structure has at least two different locking positions for the data storage device.

19. The mounting apparatus as claimed in claim 18, wherein one of the fixing member and the latching member defines a plurality of locking slots, and the other of the fixing member and the latching member forms a protruding portion being capable of selectively end detachably locking with the locking slots.

20. The mounting apparatus as claimed in claim 19, wherein the latching member comprises an elastic cantilever finger formed at an side edge thereof, the protruding portion is formed at a free end of one of the fingers, a tab extends outward from the free end of the finger for drawing the protruding portion from the slot when being operated in the up-and-down direction.

* * * * *